INVENTOR

Aug. 16, 1949.  V. CRONSTEDT  2,479,038
TURBINE CONSTRUCTION

Filed Aug. 23, 1944  3 Sheets-Sheet 3

INVENTOR

Patented Aug. 16, 1949

2,479,038

UNITED STATES PATENT OFFICE 2,479,038

TURBINE CONSTRUCTION

Val Cronstedt, Marlboro, Conn., assignor to United Aircraft Corporation, East Hartford, Conn., a corporation of Delaware Application August 23, 1944, Serial No. 550,879

7 Claims. (Cl. 253—69)

This invention relates to turbines and especially to lightweight turbines for use in aircraft.

In many turbines the casing is split longitudinally to permit assembly around a solid rotor. This necessitates splitting the bearing structures and also the labyrinth seals at the ends of the rotor with resulting disadvantages in leakage, alignment and assembly. The nozzle rings must all be split, as are the seals at the peripheries of the rows of blades. A feature of this invention is a turbine having a small number of split pieces. Another feature is a turbine in which the seals at the peripheries of the blades are continuous, and at least one of the nozzle rings is also continuous.

Another feature is a turbine having unsplit bearing and seal assemblies for the rotor at the ends of the power section. Another feature is an unsplit housing supporting the assemblies.

Another feature is a multi-stage turbine substantially all of the parts of which are continuous with the exception of one or more of the nozzle rings.

When the turbine casing is split longitudinally, sealing against leakage along the lines of separation is difficult. This is especially true in turbines operating at high temperatures such as in hot gas turbines. A feature of this invention is the elimination of a longitudinal split by making substantially all of the turbine parts continuous.

Other objects and advantages will be apparent from the specification and claims, and from the accompanying drawings which illustrate an embodiment of the invention.

Figure 1:
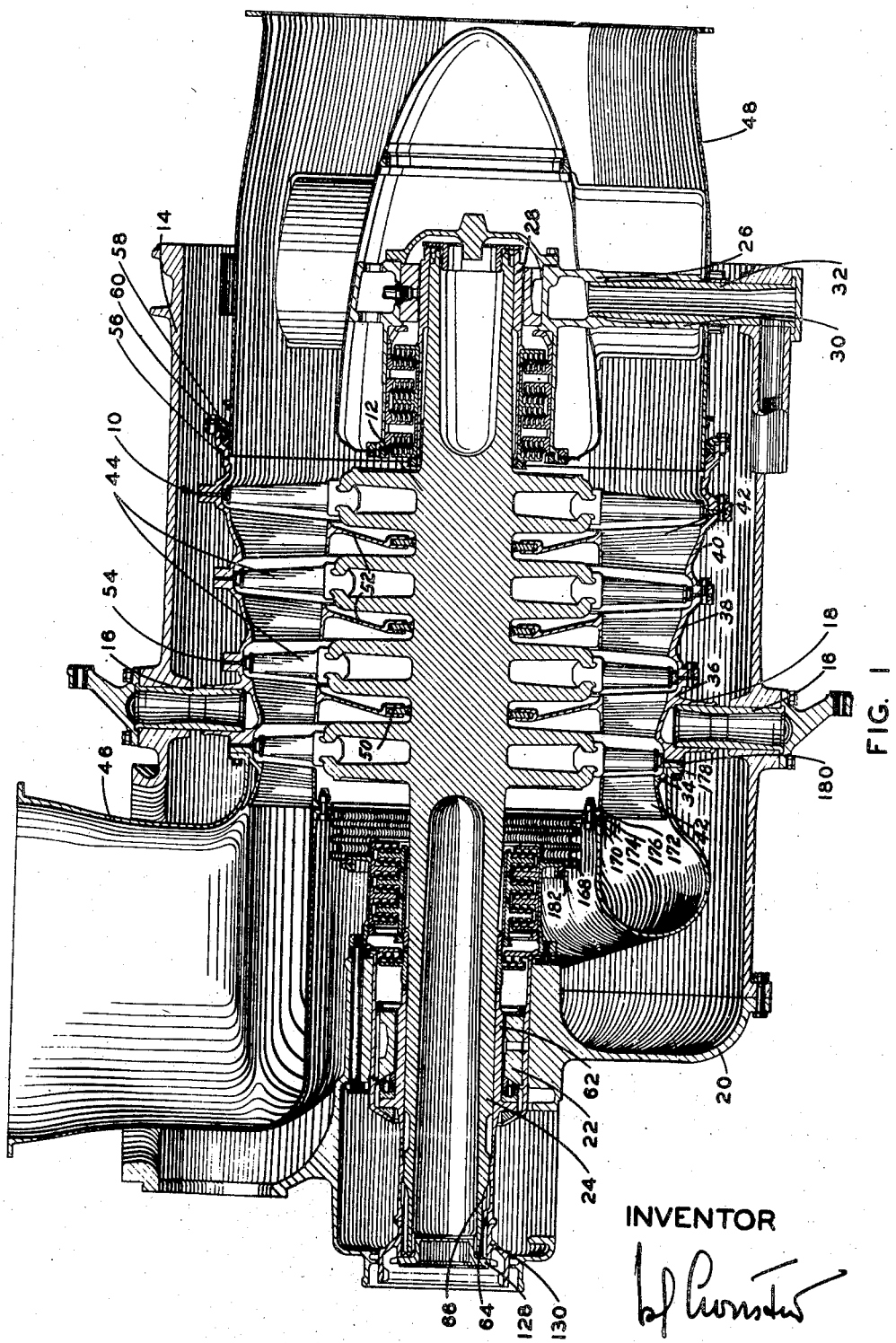
Fig. 1 is a sectional view through the turbine.

The turbine includes a casing 10 and a rotor 12 both supported in a housing 14. The casing is supported by radially extending pins 16 carried by the housing and engaging in bores in bosses 18 in the casing. These pins are all in substantially the same plane and constitute the sole support for the casing so that the casing is free to expand lengthwise. In the plane of the pins the casing is smaller than the housing and clearance is provided at the inner ends of pins 16 to permit the casing to expand radially.

Housing 14 has a head 20 which forms a part of the housing and supports a bearing 22 for the front end of the turbine shaft 24 which forms an integral part of the rotor. At the other end of the housing a spider 26 supports a bearing 28 for the turbine shaft. The spider has a number of legs 30 engaging radially positioned pins 32 carried by the housing.

Casing 10 is built up of several rings 34, 36, 38 and 40, each of which has a single row of nozzle forming guides 42. These rows of guides alternate with rows of blades 44. Bosses 18 are all on ring 36 so that the supporting pins all engage the same ring. An inlet scroll 46 directs the driving fluid through the row of nozzles on the first casing ring 34 and an exhaust duct 48 guides the driving fluid from the last row of blades on the rotor.

The turbine is made with substantially all of the pieces unsplit or continuous although permitting assembly on the solid rotor. The first stage casing ring 34 is unsplit. The other casing rings 36, 38 and 40 are split and are bolted together and to each other in the assembly of the turbine. Diaphragm seals 50 carried by the diaphragms 52 of these casing rings are also split to permit assembly on the rotor. These three casing rings and the associated diaphragm seals may be the only split pieces in the turbine. Seals 54 in line with the rows of blades on the rotor are clamped between adjoining casing rings and, as will be apparent, these seals may be unsplit.

Beyond casing ring 40 is a continuous ring 56 which clamps the seal 54 for the last row of blades and which carries a flange 58 also unsplit for holding packing 60 surrounding the leading end of the exhaust duct. The latter is located by the same pins 32 that locate the rear bearing support.

In assembly of the turbine, the front bearing and seal are assembled as a unit on the turbine shaft. As shown in Fig. 2 the bearing 22 engages with a sleeve 62 having splines 64 at its outer end, Fig. 1, engaging with cooperating splines 66 on the turbine shaft. Sleeve 62 forms a bearing surface for the turbine shaft, and has a projecting rib 68 adjacent the bearing surface. One surface of rib 68 engages with a bearing ring 70 and the other surface engages a number of thrust shoes 72 carried by pins 74 in a ring 76 engaging the end of bearing 22. The opposite surfaces of rings 70 and 76 may be spherical to accommodate bending of the rotor. Bearing ring 70 engages with an inturned flange 78 on a sleeve 80 which also supports bearing 22 between a projecting rib 82 and a clamping ring 84. With the ring 84 in place the bearing ring 70, the thrust bearing, and bearing 22 are held in assembled relation with sleeve 62. All of these parts are continuous, as will be apparent.

Adjacent to bearing 22 and between this bearing and the power section of the turbine is an oil seal 86 including an unsplit sleeve 88 fitting on shaft 24 and having face splines 90 engaging with cooperating splines on the end of sleeve 62. Sleeve 88 carries radially spaced sealing elements 92 cooperating with similar elements 94 on a stationary unsplit disk 96 clamped by screws 98 between a flange 100 on sleeve 80 and a flange 102 on a sleeve 104 that supports the stationary elements of a labyrinth seal 105 which is located between the oil seal and the power section of the turbine.

The labyrinth seal is made up of unsplit pieces. As shown, the seal includes an inner sleeve 106 having a shoulder engaging a projecting rib 108 on shaft 24. The end of sleeve 106 may have face splines 109 engaging with cooperating splines on the inner end of sleeve 88. The inner end of sleeve 106 is out of engagement with turbine shaft 24 to prevent direct transmission of heat from the shaft to the seal. Sleeve 106 supports spaced sleeves 110 having interengaging face splines 112 at their adjoining edges. The sleeves 110 are locked in position between an outwardly extending flange on the inner end of sleeve 106 and a clamping ring 114 which, as shown, engages the sleeve 106 adjacent its outer end. Each of sleeves 110 has a number of projecting sealing elements 114 cooperating with similar sealing elements 116 carried by sleeves 118 fitting within sleeve 104. The sleeves 118 are clamped in position between an inturned flange on sleeve 104 and a clamping ring 120, the latter engaging sleeve 104 adjacent its outer end.

The labyrinth seal may be assembled as a unit. The elements of the oil seal may then be placed in position at the end of the labyrinth seal and the bearing assembly is then connected to the seal assembly by the screws 98. A spacer ring 122 may be clamped against flange 100 by the screws 98. After the remainder of the turbine is assembled the front bearing and seal assembly is held in place within a sleeve 124 by studs 126 extending through sleeve 124 and held in place in nuts 127. Sleeve 124 is an integral part of head 20.

Figure 2:
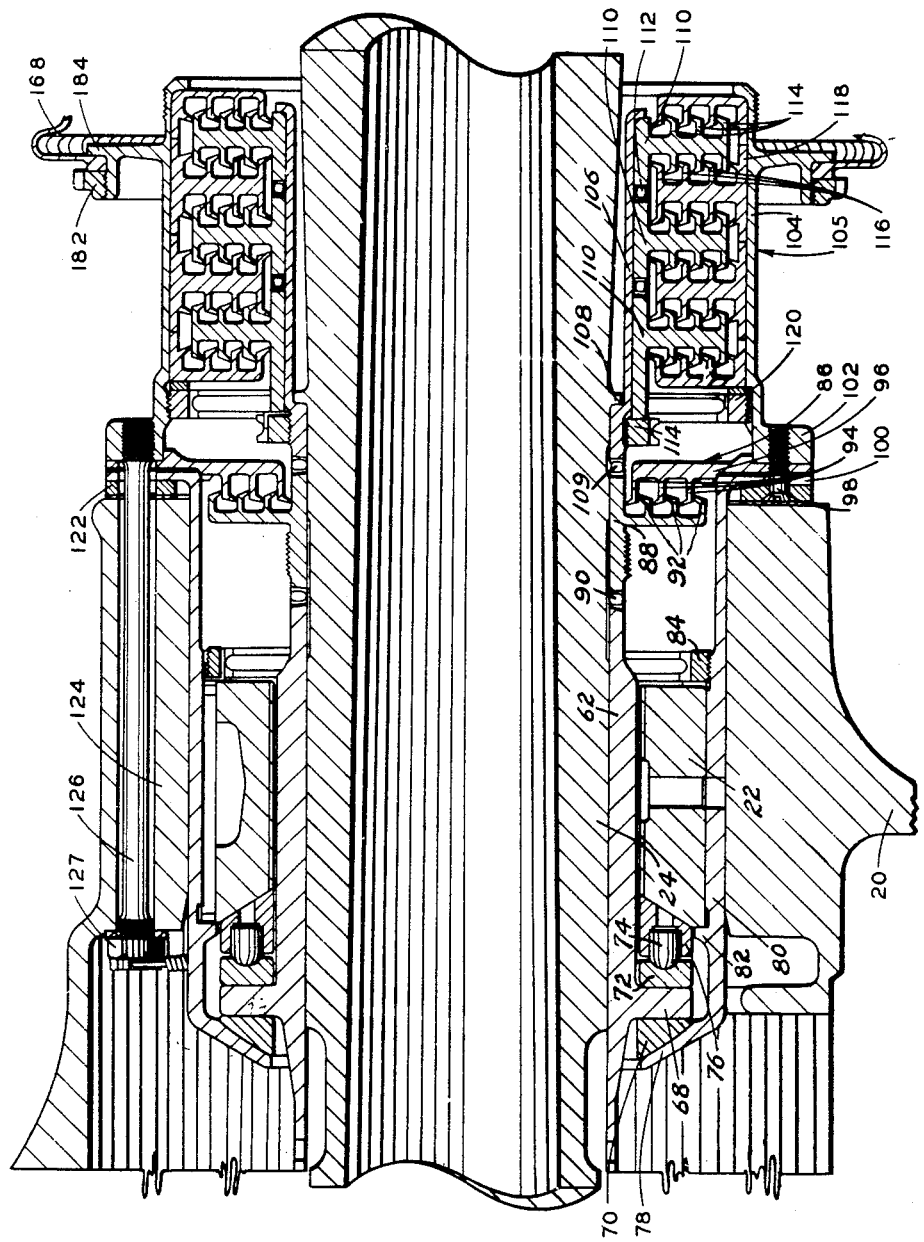
Fig. 2 is a fragmentary sectional view on a larger scale of the front bearing and seal.
Figure 3:
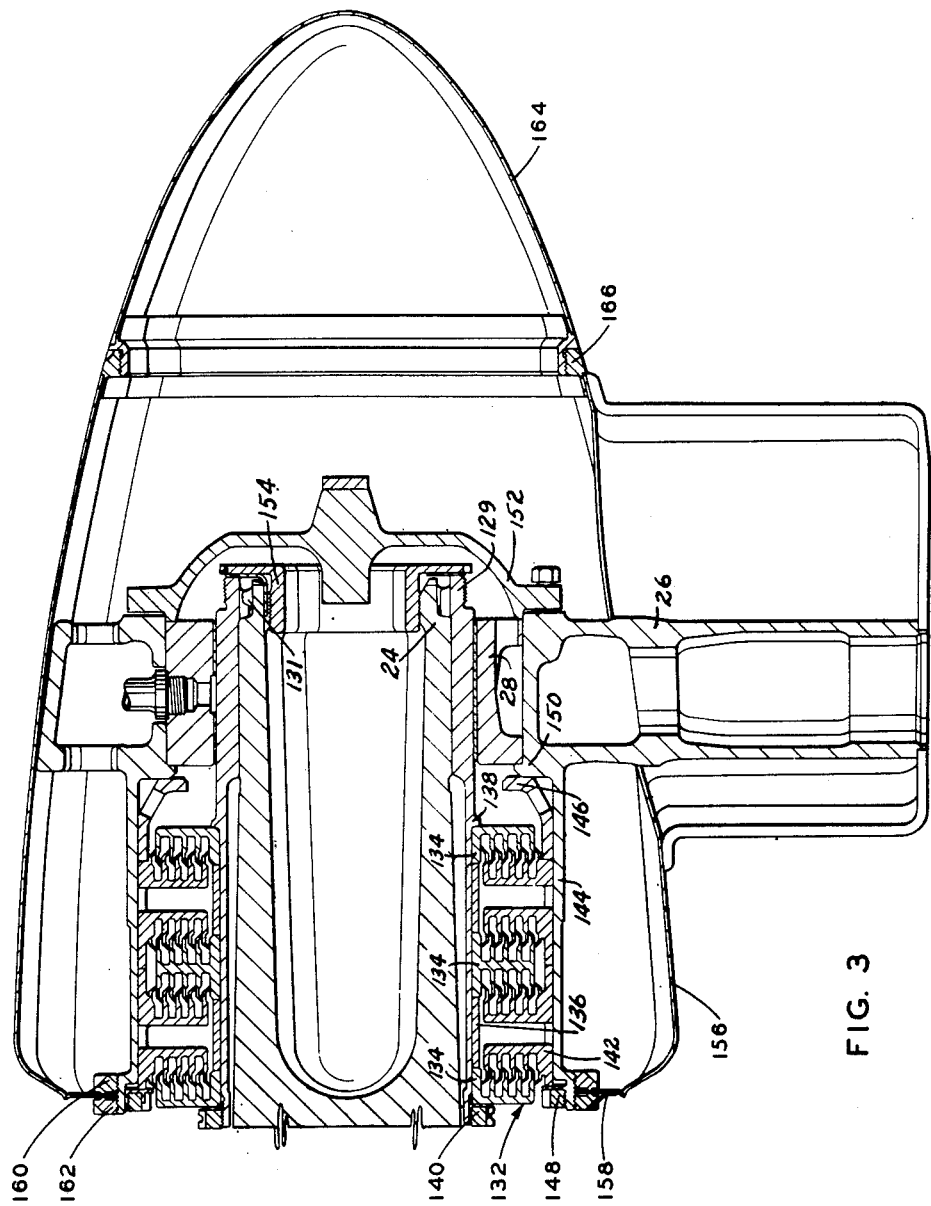
Fig. 3 is a fragmentary sectional view of the rear bearing and seal.

Referring to Fig. 1, sleeve 62 may be clamped securely on the turbine shaft by a threaded clamping ring 128 which clamps a splined sleeve 130 against the end of sleeve 62. This sleeve 130 also holds sleeves 88 and 106 in position on the shaft.

The rear bearing and the seal assembly is also made up of pieces, all of which are continuous. The turbine shaft carries a sleeve 129 which is caused to rotate with the shaft by cooperating splines 131 at the outer ends of the sleeve and shaft. This sleeve has a surface which cooperates with the bearing 28 and the inner surface of the sleeve coincident with the bearing surface engages the turbine shaft. The remainder of the sleeve 129 constitutes a cylindrical extension which is spaced from the shaft to prevent direct transfer of heat from the shaft to the labyrinth seal 132. This seal is made up of inner sealing elements 134 mounted on the outer surface of the extension of sleeve 129 held apart by sleeves 136 and clamped between a rib 138 on this sleeve and a threaded clamping ring 140. Cooperating with the elements 134 are outer sealing elements 142 fitting within a cylindrical sleeve 144 extending from the spider 26 and clamped between a spacer ring 146 and a threaded clamping ring 148. The sealing elements may be assembled one after the other in position and locked in place by the clamping rings 140 and 158.

The bearing 28 which is slidable axially on sleeve 129 is clamped against a shoulder 150 on the spider 26 by an end cap 152. The latter is not mounted until a threaded clamping ring 154 is secured to the end of the shaft to hold sleeve 128 in place.

Surrounding spider 26 is a fairing 156 which may be made up of segmental elements welded together and having a ring 158 at the forward end which is clamped between cooperating rings 160 and 162 on sleeve 144. The rearward end of fairing 156 is a dome 164 threaded to a ring 166 on the main section of the fairing. Removal of dome 164 permits access to cap 152 for assembly or disassembly of the turbine.

The rear bearing and seal assembly having been placed on the turbine shaft, continuous ring 56 together with ring 58 and packing 60, is placed on exhaust duct 48. The last stage nozzle seal 54 which is continuous is then placed on ring 56 and the split casing rings 40, 38 and 36 together with the split diaphragm seals 50 are successively placed in position around the rotor. The unsplit first stage nozzle ring 34 together with the inlet scroll and a flexible seal 168 are then attached to the rest of the casing as a sub-assembly. The nozzle ring has previously been connected to an inner flange 170 on the inlet scroll by bolts 172 which extend through flange 170, a flange 174 on the flexible seal, and a flange 176 extending inwardly from casing ring 34. An outer flange 178 on the inlet scroll and a cooperating flange 180 on the first stage nozzle permit attachment of the scroll and nozzle ring directly to the second stage nozzle ring 36. The outer end of the flexible seal 168 is clamped by a ring 182 against a shoulder 184, Fig. 2, projecting from sleeve 104.

The casing and inlet scroll together with the front and rear bearing and seal assemblies having been mounted on the rotor, housing 14 is mounted in place by the pins 16 and the spider 26 is located by the pins 32. Cap 20 is then fastened to housing 14 and the front bearing and seal assembly is located in predetermined relation to the cap by the studs 126.

From the above description it is apparent that all of the annular parts of the turbine are continuous or unsplit with the exception of the second, third or fourth stage casing rings and the diaphragm seals supported by these rings. Assembly of the entire turbine is possible, as above outlined, and the necessity for a heavy construction to compensate for stresses developing longitudinal lines of separation is avoided.

It is to be understood that the invention is not limited to the specific embodiment herein illustrated and described, but may be used in other ways without departure from its spirit as defined by the following claims.

I claim:

1. A multi-stage axial flow turbine including a rotor having a number of axially spaced rows of blades, a casing surrounding said rotor and including a number of casing rings each having a row of nozzles alternating with said blades, and diaphragms extending inwardly from said rows of nozzles and having diaphragm seals at their inner edges, circumferentially continuous housing extending around said casing, a labyrinth seal and bearing assembly at one end of the rotor, said assembly including a continuous annular element having a substantially cylindrical outer surface to fit within a cooperating cylindrical surface on the housing for endwise insertion of the assembly into the housing, and an inlet duct and a discharge duct connected to opposite ends of the casing, substantially all of said parts being unsplit with the exception of certain of the casing rings and the diaphragm seals carried thereby, said casing rings being of such a diameter as to extend beyond the tips of the blades and of such a width as to engage endwise with each other, and means for securing said rings together in endwise relation.

2. A multi-stage axial flow turbine including a rotor having a number of axially spaced rows of blades, a casing surrounding said rotor and including a number of casing rings each having a row of nozzles alternating with said blades, and diaphragms extending inwardly from said rows of nozzles and having diaphragm seals at their inner edges, a circumferentially continuous housing extending around said casing, means extending between said housing and casing for supporting said casing, the latter having its outside diameter small enough to permit endwise assembly of the casing within the housing, a labyrinth seal and bearing assembly at one end of the rotor, said assembly having an outer continuous annular element having a substantially cylindrical outer surface to fit within a cooperating cylindrical surface on the housing for endwise mounting of the assembly within the housing, a bearing and labyrinth seal assembly at the other end of the rotor, means interconnecting said housing and said last assembly and supporting said last assembly and an inlet duct and a discharge duct connected to opposite ends of the casing, substantially all of said casing rings with the rows of nozzles and diaphragms thereon being split, all of the other parts except for the casing and assembly supporting means being unsplit elements, and means for connecting the casing rings together in endwise relation.

3. A multi-stage axial flow turbine including a rotor having a number of axially spaced rows of blades, a casing surrounding said rotor and including a number of casing rings each having a row of nozzles alternating with said blades and diaphragms extending inwardly from said nozzles, diaphragm seals at the inner edges of the diaphragms, circumferentially continuous housing extending around said casing, means extending between said housing and casing for supporting said casing, a labyrinth seal and bearing assembly at least at one end of the rotor, means associated with the housing for supporting said assembly, an inlet duct and a discharge duct connected to opposite ends of the casing, other seals carried by said casing in line with the peripheries of the rows of blades and located between adjoining casing rings, certain of said casing rings and the associated diaphragm seals being split for assembly over the rotor, substantially all of the remaining parts above enumerated including said assembly being unsplit elements except for the casing and assembly supporting means, and means for connecting said casing rings together, said casing rings clamping said other seals therebetween, said rings being of such a diameter that each of said other seals may be a continuous annular element.

4. An axial flow turbine including a number of casing rings each having a row of nozzles, substantially all of said casing rings with the associated row of nozzles being split, a rotor having a number of axially spaced rows of blades around which the casing rings are positioned with the rows of nozzles alternating with the rows of blades, a circumferentially continuous housing surrounding said casing, the latter being of such a diameter that it can be inserted endwise within the housing, bearing and seal assemblies at each end of the turbine rotor, each assembly including a bearing, a sleeve fitting within the bearing and engaging the rotor, sealing elements on the rotor, an outer supporting element for the bearing and sealing elements on the supporting element, an inlet duct connected to one of the rows of nozzles and having a continuous annular opening for delivering power fluid to the first row of nozzles, all of the parts above enumerated except for certain of said casing rings being circumferentially continuous elements, each of said bearing and seal assemblies being of such a diameter as to fit within and be supported by a part of the housing, each of said assemblies being positioned within the housing by endwise movement with respect to the housing, and means for connecting said casing rings together in endwise relation.

5. A multi-stage axial flow turbine having a rotor with a number of rows of axially spaced blades, a number of casing rings each having a row of nozzles, certain of said casing rings being split for assembly of the rings over the rotor, said rings being positioned in end to end relation around the rotor with the rows of nozzles alternating with the rows of blades, means for clamping said rings together in endwise relation, a circumferentially continuous housing surrounding the casing, means extending between the housing and casing for supporting the casing and bearing and seal assemblies at each end of the casing, each assembly including a bearing, a sleeve fitting within the bearing and engaging the rotor, sealing elements on the rotor, an outer supporting element for the bearing and sealing elements on the supporting element, said housing having means associated therewith for supporting said assemblies, all of the elements of the bearing and seal assemblies being continuous annular elements, one of said assemblies including an end thrust bearing, each of said assemblies having a substantially cylindrical inner surface for endwise assembly as a unit over the end of the rotor.

6. A multi-stage axial flow turbine having a rotor with a number of axially spaced blades, a number of casing rings each having a row of nozzles, said rings being positioned in end to end relation around the rotor with the rows of nozzles alternating with the rows of blades, one of said casing rings being a continuous annular element and the remainder being split for assembly over the rotor, means for securing adjoining casing rings in endwise relation together, a circumferentially continuous housing surrounding the casing, means interconnecting the housing and casing for supporting the casing, and bearing and seal assemblies at each end of the casing, each assembly including a bearing, a sleeve fitting within the bearing and engaging the rotor, sealing elements on the rotor, an outer supporting element for the bearing and sealing elements on the supporting element, means associated with the housing and engaging each of said assemblies for supporting the assemblies within the housing, all of the elements of the bearing and seal assemblies being continuous annular elements.

7. A multi-stage axial flow turbine having a rotor with a number of rows of axially spaced blades, a number of casing rings each having a row of nozzles, said rings being positioned in end to end relation around the rotor with the rows of nozzles alternating with the rows of blades, one of said casing rings being a continuous annular element and the remainder of the rings being split, means interconnecting adjacent casing rings for securing them together, a diaphragm extending inwardly from the nozzles of each of the split rings and a diaphragm seal mounted on each of the diaphragms, a circumferentially continuous housing surrounding the casing, means interconnecting the housing and casing for supporting the casing, and bearing and seal assemblies at each end of the casing, each assembly including a bearing, a sleeve fitting within the bearing and engaging the rotor, sealing elements on the rotor, an outer supporting element for the bearing and sealing elements on the supporting element, means associated with the housing and engaging each of said assemblies for supporting the assemblies, all of the elements of the bearing and seal assemblies being continuous annular elements, one of said assemblies having a cylindrical outer surface fitted within and supported by a cooperating cylindrical surface on the housing, and inlet and discharge ducts both unsplit elements located at opposite ends of the casing, said exhaust duct being supported by the housing.

VAL CRONSTEDT.

REFERENCES CITED

The following references are of record in the file of this patent:

UNITED STATES PATENTS

| Number | Name | Date |
|---|---|---|
| 2,080,425 | Lysholm | May 18, 1937 |
| 2,282,894 | Sheldon | May 12, 1942 |
| 2,415,104 | Ledwith | Feb. 4, 1947 |